United States Patent [19]

Gross

[11] 3,824,380

[45] July 16, 1974

[54] DEVICE FOR VARYING THE THRUST OF A PIVOTABLE SCREW ON A SHIP

[75] Inventor: Harald Gross, Heidenheim, Germany

[73] Assignee: J. M. Voith GmbH, Heidenheim/Brenz, Germany

[22] Filed: Mar. 1, 1973

[21] Appl. No.: 336,913

[30] Foreign Application Priority Data

Mar. 4, 1972  Germany............................ 2210494

[52] U.S. Cl............. 235/150.2, 115/34 R, 235/189, 235/192, 318/588
[51] Int. Cl............................................. G06g 7/70
[58] Field of Search............. 235/150.2, 151.3, 191, 235/192, 189; 318/588; 115/34 R, 34 B, 35; 416/27, 30, 43

[56] References Cited
UNITED STATES PATENTS

| | | | |
|---|---|---|---|
| 3,407,292 | 10/1968 | Cox................................ | 235/192 X |
| 3,518,022 | 6/1970 | Adams................................ | 416/27 |
| 3,686,485 | 8/1972 | Wiley et al...................... | 235/150.2 |
| 3,710,088 | 1/1973 | Blaschke et al.................... | 235/189 |

Primary Examiner—Felix D. Gruber
Assistant Examiner—Jerry Smith
Attorney, Agent, or Firm—Edmund M. Jaskiewicz

[57] ABSTRACT

A device is provided for varying the magnitude and direction of thrust of a pivotable screw on a ship having a drive means for the screw and a drive means for pivoting the screw. A pair of potentiometers are selectively adjustable to values expressed in cartesian coordinates responsive to the magnitude and direction of thrust respectively. An amplifier is connected to the output of each of the potentiometers and an analog computer means having a plurality of stages is connected to the outputs of the amplifiers. The analog computer means includes a pair of squaring stages connected to the amplifiers, an adding stage connected to the outputs of the squaring stages, a square root stage connected to the output of the adding stage and a dividing stage connected to the output of the square root stage and the the output of the amplifier which has been adjusted to the x-coordinate value. The output of the square root stage is also connected to a governor or other structure for regulating the thrust of the screw and the output of the dividing stage is connected to a control circuit for the pivoting of the screw.

4 Claims, 2 Drawing Figures

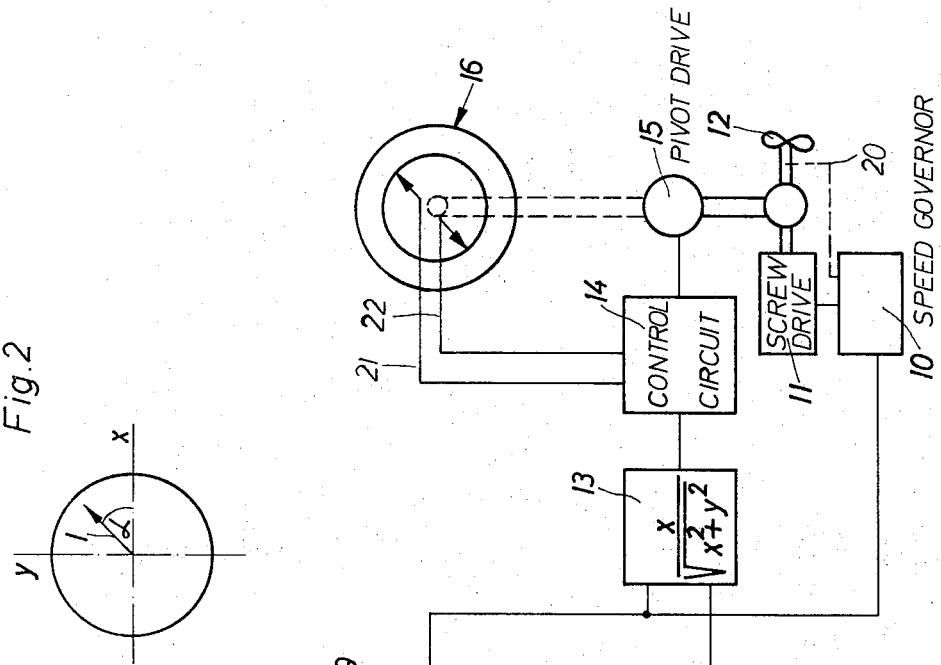
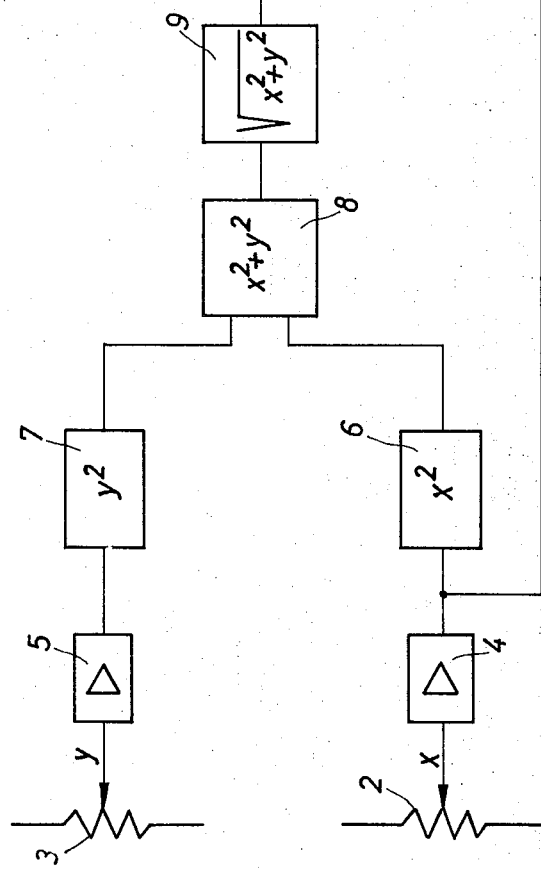

DEVICE FOR VARYING THE THRUST OF A PIVOTABLE SCREW ON A SHIP

The present invention relates to the control of a ship having a pivotable screw, more particularly, to a device for varying the magnitude and direction of thrust of such a pivotable screw.

A ship provided with a pivotable screw generally has a drive for pivoting the screw and a main drive which rotates the screw at a desired speed. A lever and a rudder wheel are conventionally employed for controlling the magnitude and direction of thrust of the screw. The lever is employed to control the rotational speed of the prime mover and thereby the magnitude of the thrust delivered by the screw or the angular position of the screw blades while the rudder wheel controls the pivoting of the screw. By way of example, if it is desired to reverse the direction of the ship from full speed ahead to full speed astern, it would normally be merely necessary to pivot the ships screw through an angle of 180°. However, the pivoting of the screw introduces certain problems since during the pivoting movement a lateral thrust is transmitted by the screw and this lateral thrust is undesirable since it complicates the control of the ship. It is desirable that this lateral thrust be reduced to zero during the reversing operation. In order to accomplish this, it is necessary for two control elements to be actuated with respect to each other. Such a control may also cause the existence of undesirable thrust forces.

It is therefore the principal object of the present invention to provide a novel and improved device for varying the magnitude and direction of thrust of a pivotable screw on a ship.

It is another object of the present invention to provide such a device wherein the magnitude and direction of thrust of the screw may be accurately controlled by means of simple operating procedures while avoiding undesirable thrust forces.

The objects of the present invention are achieved and the disadvantages of the prior art are overcome by the control device of the present invention. According to one aspect of the present invention, there are provided two potentiometers which are selectively adjustable to values expressed in cartesian coordinates which are indicative of the magnitude and direction of the thrust force. These values are then separately amplified and are supplied to an analog computer means having a plurality of stages. These stages separately generate a magnitude of thrust signal which is then supplied to a speed governor or to the blade adjusting means in the case of a ship having variable pitch blades and a direction of thrust signal which is supplied to a control circuit for the drive for pivoting the screw.

As a result of measuring the values of magnitude and direction of thrust in terms of $x$ and $y$ coordinates and feeding these coordinate values into analog computer stages, any variation of the direction of thrust will not produce an undesirable thrust force since the thrust force will be reduced corresponding to the angular position of the direction of thrust.

Other objects and advantages of the present invention will be apparent upon reference to the accompanying description when taken in conjunction with the following drawings, which are exemplary, wherein;

FIG. 1 is a schematic block diagram of the device according to the present invention; and FIG. 2 is a vector diagram with the vector representing a control lever and also the desired thrust of the screw.

Proceeding next to the drawings wherein like reference symbols represent the same parts throughout the various views, a specific embodiment of the present invention will be described in detail.

In the vector diagram of FIG. 2, a control lever 1 illustrated as an arrow, is pivotally mounted at the intersection of the $x$ and $y$ axes and is freely moveable in both directions. The arrow represents the desired thrust of the ship's screw with the length of the arrow representing the magnitude of the thrust and the angle $\alpha$ included between the arrow and the $x$ axes representing the direction of thrust.

The control lever 1 is suitably connected to a pair of potentiometers 2 and 3 which resolve the polar coordinates indicating the position of the control lever into $x$ and $y$ coordinates of a cartesian coordinate system. The $x$ coordinate represents the transverse component of thrust and the $y$ coordinate represents the longitudinal component thereof with respect to the direction of travel of the ship. It is also possible to provide separate levers for controlling the potentiometers 2 and 3 instead of the common control lever 1.

The potentiometers 2, 3 are connected to the inputs of integral action amplifiers 4 and 5 respectively which amplify the signal supplied by the respective potentiometer. Any change of signal is not transferred suddenly by these amplifiers but only at a gradually increasing rate.

An analog computer having a plurality of stages as known in the art, is connected to the outputs of the amplifiers. The first stage of the analog computer comprises squaring stages 6 and 7 which are connected to the outputs of the respective amplifiers and square the values supplied thereto ($x^2$, $y^2$). These signals are then individually supplied to an adding stage 8 ($x^2 + y^2$) whose output is then connected to a square root stage 9 ($\sqrt{x^2 + y^2}$). The output signal from the square root stage 9 represents the value of the magnitude of thrust and is a measurement of the hypotenuse of a right triangle of which the arrow 1 is the hypotenuse and the x and y coordinates are the sides. The magnitude of thrust signal is supplied to a speed governor 10 which is operatively connected to the main drive of the ship screw 12 in a manner known in the art. Where the ship screw is provided with variable pitch screw blades instead of a speed governor, adjusting means may be directly coupled as indicated by the dashed line 20 to the screw blades.

The output of the square root stage 9 is also connected to a dividing stage 13 having a second input which is directly connected to the output of the amplifier 4 into which is fed the $x$-coordinate value. The cosine of the angle $\alpha$ of the measured value of the direction of thrust is thus formed in the dividing stage 13 by dividing the $x$ coordinate by the value $\sqrt{x^2 + y^2}$ obtained from the square root stage 9. The resulting signal corresponds to the direction of thrust and is supplied to a control circuit 14 associated with a drive 15 for pivoting the ship screw 12. It is advantageous to also provide a measured value potentiometer 16 which is coupled to the pivoting drive 15 of the screw 12. The output value of the potentiometer is then supplied at 21 and 22 in the form of feedback to the control circuit 14 for adjusting the pivoting drive. The output signals of the potentiometer 16 thus permits precise control of the pivoting drive 15 and prevents overshooting of the pivoting drive beyond the value desired.

Thus it can be seen that the present invention has disclosed a simple but reliable device for varying the magnitude and direction of thrust of a pivotable ship screw by means of a drive for pivoting the ship's screw and by means of a main drive for the screw. Because of the interrelationship of the values of magnitude and direction of thrust as fed to the potentiometers varying the direction of thrust will automatically reduce the magnitude of the thrust and thus prevent the occurrence of undesirable lateral thrust forces.

It is understood that this invention is susceptible to modification in order to adapt it to different usages and conditions and, accordingly, it is desired to comprehend such modifications within the invention as may fall within the scope of the appended claims.

What is claimed is:

1. A device for varying the magnitude and direction of thrust of a pivotable screw on a ship while avoiding undesirable lateral thrust during a change of direction of the thrust of the ship and the ship having a drive means for the screw and drive means for pivoting the screw comprising first and second potentiometers selectively adjustable to values expressed in cartesian coordinates ($x$ and $y$) corresponding to the magnitude and direction of thrust, first and second amplifier means connected to said potentiometers respectively to amplify separately each of the $x$ and $y$ signals, analog computer means having a plurality of stages connected to the outputs of said amplifier means for generating signals responsive to said cartesian coordinate values and corresponding to the magnitude of thrust and direction of thrust in terms of polar coordinates and supplying said magnitude of thrust polar coordinate signal to a screw thrust regulating means and supplying said direction of thrust polar coordinate signal to a circuit controlling the pivoting of the screw.

2. A device as claimed in claim 1 wherein said analog computer means comprises a pair of squaring stages connected to said amplifier means respectively, an adding stage connected to the outputs of said squaring stages, a square root stage connected to the output of said adding stage and having an output, a dividing stage connected to the output of said square root stage and to the output of the amplifier means which is adjustable to the x-coordinate value, the output of said square root stage also connected to a screw thrust regulating means, the output of said dividing stage being connected to a circuit controlling the pivoting of the screw.

3. A device as claimed in claim 1 and comprising a measured value potentiometer coupled to the pivoting drive for the screw and having an output connected to a circuit controlling the pivoting drive.

4. A device as claimed in claim 1 wherein said amplifier means each comprises an integral action amplifier which transmits changes in the value supplied thereto at a gradually increasing rate.

* * * * *